United States Patent Office 3,153,025

Patented Oct. 13, 1964

3,153,025

PROCESS FOR OXIDIZING POLYETHYLENE AND COPOLYMERS CONTAINING SAME

Richard W. Bush, Takoma Park, and Razmic S. Gregorian, Silver Spring, Md., assignors to W. R. Grace & Co., New York, N.Y., a corporation of Connecticut No Drawing. Filed May 14, 1962, Ser. No. 194,709

11 Claims. (Cl. 260—88.2)

This invention relates to the production of oxidized high molecular weight thermoplastic polyolefins. More specifically, this invention relates to the production of oxidized high molecular weight polyethylene and copolymers thereof.

More specifically this invention is directed to a process of oxidizing high molecular weight polyethylene and copolymers of ethylene and butene-1 in which said polymers and copolymers are in solid form.

It is known in the art to oxidize low molecular weight polyethylene in the melt in the presence of a wax and an organic peroxide to obtain wax grade polymeric material. See U.S. 2,952,649. To be processed as described in the aforementioned patent, the starting polymers must be of relatively low molecular weight. Therefore the oxidized products are of such low molecular weight as to be useless in manufacture of extruded or molded articles. Such a process would be commercially inoperable with the high molecular weight polymer of the instant invention because of the inability to process it in the melt due to its high viscosity. Thus one object of the instant invention is a method for oxidizing high molecular weight polyethylene to a product having a final melt index in the range 0.1 to 20 which can be subsequently extruded, molded or the like into shaped articles such as bottles, etc.

Oxidized polyethylene is a useful intermediate from which various end products can be produced. For example oxidized polyethylene can be used as an intermediate for non-radical crosslinking. In addition oxidized polyethylene and oxidized ethylene butene-1 copolymers are readily emulsifiable by suitable ionic and non-ionic surface active agents. Oxidized polyethylene and oxidized ethylene butene-1 copolymers are also useful as end products per se having improved adhesive properties and printability.

Solid polyethylene plastic materials, such as films, sheets and manufactured articles, e.g. bottles and other vessels, are well known in the art today. These materials, however, display rather poor receptivity for printing inks and for adhesives. In recent years various treating processes and techniques have been developed to oxidize the surfaces of polyethylene structures to increase their adhesiveness toward other materials. These treating techniques have resulted in improving the adherence between polyethylene structures and substrate materials, dried ink impressions, various coating compositions, etc. In addition, these treatments are valuable for improving the bond strength between polyethylene surfaces and other base materials such as glass, wood, paper and metals, when standard adhesive techniques are employed to effect bonding. Some of the well-known treatments for improving the adhesiveness of polyethylene structures include treatment of the polyethylene surface with a gas flame or with an acid dichromate solution. These treatments introduce polar oxygenated functional groups into the polyethylene but have been limited to the surface of the molded polyethylene structure.

The bulk oxidation of polyethylene introduces polar oxygenated functional groups more or less homogeneously throughout the entire bulk of the polymer. However, the bulk oxidation of normal grades of polyethylene produces only low molecular weight extremely fluid polyethylene materials which are difficult to process in standard molding and extrusion equipment at molding temperatures. Moreover, the molded products of these oxidatively degraded polymers are weak and brittle at room temperature.

In an application having Serial Number 147,754 and now abandoned, filed October 26, 1961, and assigned to the same assignee there is disclosed a method of oxidizing high molecular weight polyethylene in bulk by contacting it with an oxygen containing vapor at a temperature in the range 100–200° C. By this method polyethylene and copolymers of ethylene and butene-1 of an extremely high molecular weight, e.g. with a melt index less than 0.01, can be oxidatively degraded to a product with a molecular weight high enough to be easily processable by known techniques, and which also has improved adhesive properties. Films pressed from the oxidatively degraded polyethylene of this invention are tough and flexible at room temperature. However, this process has the drawback that the oxidation period is of such duration as to tend to make the process uneconomical. Oxidation periods of eight to ten hours or more are necessary to obtain a useable carbonyl content in the polymer. The novel feature of the present invention is the use of an organic peroxide to greatly reduce the length of time required to oxidize the polymer.

Summarily the instant invention is concerned with producing oxidized polymers from members of the group consisting of high molecular weight polyethylene having an initial melt index of less than 0.01 and copolymers of ethylene and butene-1 having an initial melt index of less than 0.01 which comprises admixing said group member in solid form with 0.01 to 5.0% of an organic peroxide capable of generating free radicals at an effective rate at a temperature in the range 80 to 140° C., and thereafter in the presence of free oxygen heating said admixture while maintaining the polymer in solid form at a temperature ranging from 80° C. up to but not including the melting point of said group member until the carbonyl content of said oxidized group member is at least about 0.05% and the melt index is between 0.1 and 500 or higher. The ratio of percent carbonyl to the square root of the melt index in the oxidized product is 0.080 or greater.

The high molecular weight polyethylene and high molecular weight copolymers of ethylene and butene-1 operable in this invention can be produced by many methods well known in the art. For example linear polyethylene having a melt index less than 0.01 and copolymers of ethylene and butene-1 having a melt index less than 0.01 can be obtained using the Phillips catalyst system i.e. chromium oxide on an $SiO_2$-$Al_2O_3$ support wherein at least part of the chromium is in the hexavalent state when the polymerization is performed at temperatures of 60–70° C. See U.S. 2,825,721. Another catalyst capable of forming high molecular weight polyethylene having a melt index of less than 0.01 is $TiCl_2$. Yet another catalyst system consisting essentially of vanadium oxytrichloride and ethyl aluminum dichloride will yield polyethylene having a melt index less than 0.01. Still another catalyst system yielding very high molecular weight polyethylene having a melt index less than 0.01 comprises $TiCl_3$ and diethyl aluminum chloride.

Melt index (MI) is a measure of polyethylene flow at a standard condition of temperature, pressure and time through an orifice of defined diameter and length as specified in ASTMD 1238–57T. The rate of extrusion in g./10 minutes is the melt index, and it is used to indicate the average molecular weight of a polymer. The lower the molecular weight of a polymer the more rapidly it extrudes, and therefore, melt index increases as polymer molecular weight decreases. Normal grades of polyethylene have a melt index ranging from about 0.1 to 10 or higher, depending on the intended use of the material. In general when the melt index of polyethylene is above about 20.0, the polymer has low mechanical strength and thus has its greatest application in such areas as adhesives and coatings.

The general procedure of the present invention is to admix the high molecular weight ethylene containing polymer or copolymer preferably in particulate solid form with the organic peroxide (usually 0.1 to 5.0% peroxide by weight of polymer) in a suitable mixing mechanism e.g. Twin Shell blender at room temperature. Preferably the organic peroxide is solubilized in a hydrocarbon solvent which solvent is thereafter evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide employed and its inertness thereto. Operable solvents include volatile aromatic and aliphatic hydrocarbons such as benzene, toluene, pentane, and hexane.

The thus blended polymer-peroxide mixture is then subjected to oxidation. One method of oxidation is to pass air over the mixture while being heated in an oven at temperatures up to the melting point of the polymer or copolymer. Another method is to pass air or oxygen through a fluidized bed of the polymer-peroxide mixture while maintaining it at a temperature below the melting point of the polymer. The rate of oxidation increases with increasing temperature. Therefore it is preferred to carry out the oxidation at as high a temperature as possible without melting the polymeric material. Thus temperatures within 20° C. below the melting point of the polymer are usually employed. One practicing this invention should realize that as the oxidation proceeds, the molecular weight of the polymer decreases, and that one must stop the oxidation before the polymer degrades to such an extent that it no longer has a useful molecular weight. In general the oxidized ethylene-containing homopolymer and copolymer of the instant invention have a melt index in the range 0.1 to 500 or higher. For the processing of molded or extruded articles and the like, oxidized material of this invention having a final melt index in the range 0.1 to 20 is preferred. However, oxidized materials of final melt index up to 500 or higher are useful in certain other specified areas such as in adhesive formulations, emulsions, etc.

The oxidation step can be terminated at any desired degree of oxidation and subsequently stabilized. For example, a suitable antioxidant such as 4,4'-thiobis(6-t-butylmetacresol) sold under the tradename "Santonox" by Monsanto Chemical Company or N-phenyl-2-napthylamine can be added to the oxidized polymer. Once the oxidized polymer has been stabilized, an accurate determination of its melt index can be made.

The following examples are set down to illustrate the invention and are not deemed to limit its scope. Throughout the instant invention tests were conducted as follows:

The extent of oxidation of the polyethylene and copolymer of ethylene and butene-1 was determined by ascertaining the carbonyl content of the polymeric material by infrared analysis using the peak at 1720 cm.$^{-1}$. By the word "carbonyl" is meant primarily ketone and aldehyde groups. A Perkin Elmer spectrophotometer, Model 221, was used. The reported percent carbonyl is defined as $$\frac{\text{gms. C=O}}{\text{gms. polymer}} \times 100$$

Melt indices (MI) were measured under the conditions specified in ASTMD 1238–57T.

Densities of the polymer were measured under the conditions specified in ASTMD 1505–57T.

Reduced specific viscosity, i.e. RSV, was obtained by dissolving 0.1 g. of the polymer in 100 cc. Decalin at 135° C. in accord with the procedure of ASTMD 1601–58T.

Unless otherwise noted, all parts and percentages are by weight in the examples.

EXAMPLE 1

5 g. of commercially available linear polyethylene in particulate form having a melt index of 0.00, a melting point of 135° C., a density of 0.954 and a reduced specific viscosity of 6.0 was slurried at room temperature i.e. 23° C. in a benzene solution containing 0.5% benzoyl peroxide based on the weight of the polymer. The benzene was evaporated and the resultant material was placed in a circulating air oven maintained at a temperature of 128° C. After 6 hours the polymeric material was removed for characterization. The polyethylene product had a melt index of 0.90 and contained 0.45% carbonyl as determined by infrared analysis. A control sample of the polyethylene in Example 1 containing no peroxide developed only 0.015% carbonyl after 6 hours in a circulating air oven at 128° C.

EXAMPLE 2

500 g. of commercially available linear polyethylene in particulate form having a melt index of 0.00, a melting point of 130° C., a density of 0.937 and a reduced specific viscosity (RSV) of 9.3 was blended in a Patterson-Kelley Twin Shell blender with a benzene solution containing 0.5% benzoyl peroxide based on the weight of the polymer for 30 minutes at room temperature. The benzene was evaporated and the polymer was transferred to a circulating air oven maintained at a temperature of 128° C. After 2½ hours the polymer was removed from the oven and stabilized above its melting point with 0.5% by weight of 4,4'-thiobis(6-t-butylmetacresol). The stabilized polyethylene on characterization had a carbonyl content of 0.49% as measured by infrared analysis and a melt index of 0.17. In contrast a control run of the same polyethylene as used in Example 2 without any peroxide required 13 hours oxidation in a circulating air oven at 128° C. to obtain a carbonyl content of 0.38% and a 0.41 melt index.

EXAMPLE 3

5 g. of commercially available polyethylene in particulate form having a melt index of 0.00, a melting point of 135° C., a density of 0.954 and a reduced specific viscosity of 4.5 was slurried at room temperature i.e. about 23° C. in a benzene solution containing 0.5% benzoyl peroxide by weight of the polymer. The benzene was evaporated off and the mixture was placed in a glass column (I.D. 22 mm.) fitted with a glass frit at the bottom and jacketed with hot oil at 124° C. Oxygen at 124° C. was passed through the polymer bed at about 2200 cc./min./cm.$^2$ (STP) i.e. sufficient to fluidized the polymer. After one hour the polymer was removed and characterized. The polymer had a carbonyl content of 0.14% carbonyl.

EXAMPLE 4

Example 1 was repeated except that the polymeric material was a commercially available copolymer of ethylene and butene-1 in particulate form having a density of 0.939, a melting point of 130° C., a melt index of 0.00 and a RSV of 4.5. The copolymerbenzoyl peroxide mixture was placed in a circulating oven at 128° C. After 6 hours the carbonyl content as measured by infrared analysis was in excess of 0.45% and the melt index was 1.0. A control sample of the copolymer of Example 4 containing no peroxide developed a carbonyl content of less than 0.05% after 6 hours at 128° C. in a circulating air oven.

The following examples in Table I show the improved rate of oxidation obtained when an organic peroxide is admixed with the polymer prior to the oxidation step. The commercially available polyethylene used in Sample A (peroxide containing) and Sample B (no peroxide added) had a melt index of 0.00, a melting point of 135° C., a density of 0.954 and a RSV of 6.0. Sample A was slurried with equal weight of a benzene solution containing 0.5% benzoyl peroxide by weight of polymer. The benzene was evaporated at room temperature prior to the oxidation step. The oxidation of both samples was carried out in a circulating air oven at 128° C. Samples were removed and analyzed for percent carbonyl by infrared at the indicated times.

*Table I*

| Example Number | Oxidation Time (hrs.) | Percent Carbonyl | |
|---|---|---|---|
| | | Sample A | Sample B |
| 5 | 0.0 | 0.000 | 0.000 |
| 6 | 1.0 | 0.120 | 0.000 |
| 7 | 2.0 | 0.140 | 0.000 |
| 8 | 4.0 | 0.300 | 0.004 |
| 9 | 6.0 | 0.450 | 0.015 |

The following runs in Table II show the operability of the instant invention on various high molecular weight polyethylenes having a melt index less than 0.01 prior to oxidation. In all runs the polyethylene was slurried with equal weight of a benzene solution containing 0.5% benzoyl peroxide by weight of polyethylene. The benzene was evaporated at room temperature prior to the oxidation step. The oxidation step was performed in a circulating air oven at 128° C.

*Table II*

| Example Number | Sample | Oxidation Time (Hrs.) | Percent Carbonyl | Melt Index after Oxidation |
|---|---|---|---|---|
| 10 | [a] A | 4.0 | 0.40 | 1.0 |
| 11 | [b] B | 3.0 | 0.63 | 1.0 |
| 12 | [c] C | 4.0 | 0.51 | 1.0 |

[a] Commercially available polyethylene, MI=0.00, melting point =135° C., density=0.954 and RSV=4.5.
[b] Commercially available polyethylene, MI=0.00, melting point =130° C., density=0.937 and RSV=9.3.
[c] Commercially available polyethylene, MI=0.00, melting point =135° C., density=0.954 and RSV=6.0.

A one hour oxidation run using commercially available low molecular weight polyethylene having an initial melt index of 0.2, a melting point of 135° C. and a density of 0.960 resulted in an oxidized polyethylene with a melt index of 1.0 and a carbonyl content of less than 0.05%. When the oxidation was continued for as long as 4 hours, the carbonyl content was less than 0.40 but the melt index was greater than 50.0.

Thus Table II and the aforesaid run with low molecular weight polyethylene show that for a given final melt index a higher carbonyl content is obtained the higher the molecular weight of the starting polymeric material.

The following examples in Table III show the effect of peroxide concentration on the rate of oxidation. In all examples the commercially available polyethylene in particulate form had a melt index of 0.00, a melting point of 135° C., a density of 0.954 and a RSV of 6.0. The polymer was slurried with equal weights of benzene solutions containing varying percentages of benzoyl peroxide based on the weight of the polymer. The benzene was evaporated and oxidation was carried out in a circulating air oven at 128° C. for varying periods.

*Table III*

| Example Number | Oxidation Time (hrs.) | Percent C=O | | | |
|---|---|---|---|---|---|
| | | No Peroxide | 0.1% Peroxide | 0.5% Peroxide | 1.0% Peroxide |
| 13 | 0 | 0.000 | 0.000 | 0.000 | 0.000 |
| 14 | ½ | 0.000 | 0.024 | 0.095 | 0.170 |
| 15 | 1 | 0.000 | 0.034 | 0.119 | 0.168 |
| 16 | 2 | 0.000 | 0.066 | 0.174 | 0.264 |
| 17 | 4¼ | 0.004 | 0.207 | 0.340 | 0.524 |

The results show that the percent carbonyl developed in the polymer in any given oxidation period increases with the initial concentration of the organic peroxide. In practicing this invention it has been found that the amount of organic peroxide capable of generating free radicals at a temperature of 80 to 140° C. can be varied from 0.01 to 5.0% preferably 0.1 to 1.0% by weight of the polymer to be oxidized.

Table IV exhibits various peroxides which are operable as oxidation promoters in this invention. The commercially available polyethylene in particulate form used in the examples in Table IV had a melt index of 0.00, a melting point of 135° C., a density of 0.954 and a RSV of 6.0. In all examples the polymer was slurried with equal weight of a benzene solution containing 0.02 milliequivalents of an organic peroxide/gm. polymer (equivalent to 0.5% benzoyl peroxide).

The benzene was evaporated at room temperature and the oxidation step was performed in a circulating air oven at 128° C. for varying periods.

*Table IV*

| Example Number | Oxidation Time (hrs.) | Percent Carbonyl | | | |
|---|---|---|---|---|---|
| | | No Peroxide | t-Butyl Perbenzoate | Dicumyl Peroxide | Benzoyl Peroxide |
| 18 | 0 | 0.000 | 0.000 | 0.000 | 0.000 |
| 19 | ½ | 0.000 | 0.004 | 0.005 | 0.075 |
| 20 | 1 | 0.000 | 0.009 | 0.013 | 0.117 |
| 21 | 2 | 0.000 | 0.022 | 0.056 | 0.141 |
| 22 | 6 | 0.015 | 0.152 | 0.294 | 0.443 |

The following runs in Table V show various apparatus operable in performing the oxidation step of this invention. In addition the effect of temperature, and atmosphere are evidenced. In all runs in Table V the polyethylene was slurried with equal weight of a benzene solution containing 0.5% benzoyl peroxide based on the weight of the polyethylene prior to oxidation. Oxidation time for all runs was 1 hour. The oxygen-uptake apparatus consists of a double jacketed glass drying apparatus maintained at constant temperature by suitable refluxing solvents. The oxidation zone is connected to a gas buret to measure oxygen uptake. The apparatus contains suitable absorbents for any $CO_2$ and water from the oxidation.

The fluidized bed examples were performed in the same apparatus employed in Example 3. The oven example was performed in the circulating air oven used in Example 1.

*Table V*

| Example No. | Polyethylene Sample | Apparatus | Oxidation Temp., °C. | Atmosphere | Flow Rate, cc./min./cm.² | Percent C=O |
|---|---|---|---|---|---|---|
| 23 | [1] A | Oxygen-uptake | [3] 131.5 | Air | | 0.134 |
| 24 | A | do | [4] 123 | do | | 0.105 |
| 25 | A | do | [5] 116 | do | | 0.066 |
| 26 | A | do | [6] 110 | do | | 0.050 |
| 27 | [2] B | Fluidized Bed | 128 | do | 1,600 | 0.079 |
| 28 | B | do | 120 | do | 1,600 | 0.046 |
| 29 | B | do | 124 | do | ca. 2,200 | 0.041 |
| 30 | B | do | 124 | Oxygen | ca. 2,200 | 0.137 |
| 31 | B | Oven | 124 | Air | | 0.135 |

[1] Commercially available polyethylene, MI=0.00, density=0.954, melting point=135° C. and RSV=6.0.
[2] Commercially available polyethylene, MI=0.00, density=0.954, melting point=135° C. and RSV=4.5.
[3] Temperature maintained by refluxing chlorobenzene.
[4] Temperature maintained by refluxing methyl Cellosolve.
[5] Temperature maintained by refluxing n-butyl alcohol.
[6] Temperature maintained by refluxing toluene.

From the examples in Table V performed in the oxygen uptake apparatus one can note that in a given time as the temperature of the oxidation reaction is increased the percent carbonyl in the polyethylene is increased. Thus for optimum percent carbonyl in a given time it is preferred to employ as high a temperature as possible below the melting point of the polymer.

In performing the instant invention it is preferred that the polymer contain no antioxidant. However if the polymer contains an antioxidant the invention is still operable by either removing antioxidant by extraction with a suitable solvent e.g. acetone or increasing the concentration of the organic peroxide blended with the polymer, or by prolonging the time of oxidation.

One use of oxidized polyethylene is to crosslink by a non-radical mechanism in air. In Example 32 hereafter the milling was performed in an inert nitrogen atmosphere to show the present reduction of carbonyl in the polymer after crosslinking. However in commercial practice milling would be performed in air. The degree of crosslinking can be measured in various ways. For example, the degree of crosslinking is related to the increase in torque measured on a Brabender Plastograph recorder from the time the crosslinking agent is added to the molten polymer until milling is discontinued. The greater the degree of crosslinking the greater the viscosity of the polymer which in turn requires a greater torque in order to drive the Plastograph at a constant r.p.m. A further check on the degree of crosslinking is the change in melt index. Since melt index varies inversely with viscosity which varies directly with the degree of crosslinking, a lower melt index after crosslinking evidences that crosslinking occurred.

EXAMPLE 32

34 g. of oxidized polyethylene from Example 2 having a carbonyl content of 0.49% and a melt index of 0.17 were charged to a Brabender Plastograph and milled therein under nitrogen at a temperature of 160–165° C. until a constant torque was recorded indicating the polymer was molten. 0.50 g. of aluminum isopropoxide was added to the molten polymer and milling was continued under nitrogen for 13 minutes. The increase in torque from the time the aluminum isopropoxide was added until the crosslinking reaction was discontinued was in excess of 2000 meter-grams. The milling head was removed and the thus crosslinked polymer on characterization had a melt index of 0.00 and a carbonyl content less than 0.10% as obtained by infrared analysis.

EXAMPLE 33

One pound of commercially available polyethylene in particulate form having a melt index of 0.00, a melting point of 135° C., a density of 0.954 and a reduced specific viscosity of 4.5 was sprayed at room temperature with a benzene solution containing 0.5% benzoyl peroxide by weight of the polymer. The benzene was evaporated at room temperature and the polymer was heated for 7.0 hours at 120° C. in a circulating air oven. The final product on characterization had a melt index of 14 and a carbonyl content of 0.70%.

EXAMPLE 34

14 pounds of commercially available polyethylene in particulate form having a melt index of 0.0, a melting point of 135° C., a density of 0.954 and a reduced specific viscosity of 4.5 was sprayed at room temperature with a benzene solution containing 0.5% benzoyl peroxide by weight of the polymer. The benzene was evaporated and the polymer was heated for 18 hours at 120° C. in a jacketed rotary vacuum dryer equipped with an internal agitator. Air preheated to 120° C. was passed over the polymer at the rate of 0.5 cu. ft./min. The final polymer had a melt index of 180 and contained 1.24% carbonyl.

The following examples in Table VI were prepared by spraying the polyethylene in particulate form at room temperature with a benzene solution containing 0.5% benzoyl peroxide by weight of the polyethylene. The benzene was evaporated at room temperature and the polymer was heated in a jacketed rotary vacuum dryer equipped with an internal agitator as in Example 34. In all examples the polymer was commercially available polyethylene having a melt index of 0.00, a melting point of 135° C. and a density of 0.94 prior to the oxidation step.

*Table IV*

| Example No. | Polyethylene (lbs.) | Oxidation Time (hrs.) | Oxidation Temperature, °C. | Oxidized Product | |
|---|---|---|---|---|---|
| | | | | Melt Index | Percent C=O |
| 35 | [a] 14 | 18 | 120 | 180 | 1.24 |
| 36 | [a] 40 | 24 | 120 | 490 | 2.50 |
| 37 | [b] 41 | 8 | 120 | 3.0 | 0.72 |
| 38 | [b] 27 | 9 | 120 | 8.8 | 0.75 |
| 39 | [b] 33 | 11 | 120 | 28.0 | 1.03 |

[a] Polyethylene had a reduced specific viscosity (RSV) of 4.5.
[b] Polyethylene had a reduced specific viscosity (RSV) of 7.5.

This case is a continuation-in-part of application having Serial No. 182,664, filed March 26, 1962, now abandoned.

We claim:

1. A process for oxidizing members of the group consisting of high molecular weight polyethylene and high molecular weight ethylene butene-1 copolymers, said group members having an initial melt index of less than 0.01 which comprises mixing said group member in solid form with 0.01 to 5.0% of an organic peroxide capable of generating free radicals at an effective rate at a temperature in the range 80 to 140° C. and thereafter, in the presence of free oxygen, heating said mixture while maintaining said group member in solid form at a temperature ranging from 80° C. up to but not including the melting point of said group member until the carbonyl content of said oxidized group member is at least about 0.05% and the ratio of percent carbonyl to the square root of the melt index is in excess of 0.080.

2. The process according to claim 1 wherein the organic peroxide is benzoyl peroxide.

3. The process according to claim 1 wherein said heating step is performed in a fluidized bed reactor.

4. The process according to claim 1 wherein said heating step is performed in a forced air oven.

5. A process for oxidizing high molecular weight polyethylene having an initial melt index of less than 0.01 which comprises mixing said polyethylene in solid form with 0.01 to 5.0% benzoyl peroxide and thereafter in the presence of free oxygen, heating said mixture while maintaining said polyethylene in solid form at a temperature ranging from 80° C. up to, but not including, the melting point of said polyethylene until the carbonyl content of said polyethylene is at least about 0.05%.

6. The process according to claim 5 wherein said heating step is performed in a fluidized bed reactor.

7. The process according to claim 5 wherein said heating step is performed in a forced air oven.

8. A process for oxidizing a high molecular weight copolymer of ethylene and butene-1 having an initial melt index of less than 0.01 which comprises mixing said copolymer in solid form with 0.01 to 5.0% benzoyl peroxide and thereafter in the presence of free oxygen, heating said mixture while maintaining said polyethylene in solid form at a temperature ranging from 80° C. up to but not including the melting point of said copolymer until the carbonyl content of said copolymer is at least about 0.05%.

9. The process according to claim 8 in which said heating step is carried out in a fluidized bed reactor.

10. The process according to claim 8 in which said heating step is carried out in a forced air oven.

11. The process according to claim 1 wherein said heating step is performed in a rotating drum.

References Cited in the file of this patent

UNITED STATES PATENTS 3,020,174 Natta et al. ............. Feb. 6, 1962

FOREIGN PATENTS 476,476 Canada ................ Aug. 28, 1951

OTHER REFERENCES

Renfrew: "Polythene," Interscience Publishers (1960) (pages 390–391).

Peny: Chemical Engineers Handbook, McGraw Hill (1950) (pages 829 and 1620).